(12) United States Patent
Zhang et al.

(10) Patent No.: US 12,665,677 B2
(45) Date of Patent: Jun. 23, 2026

(54) REAL-TIME VECTOR ANALYSIS METHOD AND DEVICE FOR DETECTING OPTICAL SIGNAL WITH BANDWIDTH GREATER THAN 1 THz

(71) Applicant: HUAZHONG UNIVERSITY OF SCIENCE AND TECHNOLOGY, Wuhan (CN)

(72) Inventors: Chi Zhang, Wuhan (CN); Xinliang Zhang, Wuhan (CN); Lun Li, Wuhan (CN); Yuchong Cai, Wuhan (CN); Yaoshuai Li, Wuhan (CN); Chen Liu, Wuhan (CN)

(73) Assignee: HUAZHONG UNIVERSITY OF SCIENCE AND TECHNOLOGY, Wuhan (CN)

( * ) Notice: Subject to any disclaimer, the term of this patent is extended or adjusted under 35 U.S.C. 154(b) by 305 days.

(21) Appl. No.: 18/542,677

(22) Filed: Dec. 16, 2023

(65) Prior Publication Data

US 2024/0129043 A1 Apr. 18, 2024

Related U.S. Application Data

(63) Continuation of application No. PCT/CN2022/132832, filed on Nov. 18, 2022.

(30) Foreign Application Priority Data

Nov. 19, 2021 (CN) .......................... 202111374016.5

(51) Int. Cl.
*H04B 10/64* (2013.01)
*H04B 10/073* (2013.01)

(52) U.S. Cl.
CPC ......... *H04B 10/64* (2013.01); *H04B 10/0731* (2013.01)

(58) Field of Classification Search
CPC ............................ H04B 10/64; H04B 10/0731
(Continued)

(56) References Cited

U.S. PATENT DOCUMENTS

| | | | | |
|---|---|---|---|---|
| 11,112,306 B2 * | 9/2021 | Wong | .......................... | G01J 1/00 |
| 2012/0093519 A1 * | 4/2012 | Lipson | ..................... | G01J 11/00 |
| | | | | 398/157 |

(Continued)

FOREIGN PATENT DOCUMENTS

| | | | | |
|---|---|---|---|---|
| CN | 102388298 A | * | 3/2012 | .............. G01J 11/00 |
| CN | 108692816 A | | 10/2018 | |

(Continued)

OTHER PUBLICATIONS

Li et al; Time-magnified photon counting with 550-fs resolution; Aug. 2021, Optical society of America, vol. 8, No. 8, pp. 1-4. (Year: 2020).*

(Continued)

*Primary Examiner* — Amritbir K Sandhu
(74) *Attorney, Agent, or Firm* — Syncoda LLC; Feng Ma

(57) ABSTRACT

A real-time vector analysis method for detecting an optical signal with a bandwidth greater than 1 THz includes: mapping, by a time-lens focusing system, a spectrum of a signal under test to different temporal location information; obtaining, by fully broadening an ultrashort pulse by a dispersion, a time domain spectrum of the ultrashort pulse to form a chirped swept frequency source; inputting an out of the signal under test after passing through the time-lens and the chirped swept frequency source to a coherent receiver to realize an interference process and a conversion of an optical signal to an electrical signal, and recovering an intensity information and a phase information of frequency domain of the signal under test from the electrical signal by data acquisition and processing; then recovering a full-field infor- (Continued)

mation of time domain of the signal under test by a Fourier inverse transform.

7 Claims, 2 Drawing Sheets

(58) Field of Classification Search
  USPC ......................................................... 398/204
  See application file for complete search history.

(56)                    References Cited

U.S. PATENT DOCUMENTS

| | | | |
|---|---|---|---|
| 2013/0342835 A1* | 12/2013 | Blacksberg | G01J 3/2889 |
| | | | 356/318 |
| 2020/0033189 A1* | 1/2020 | Wong | G01J 3/0218 |
| 2020/0378835 A1* | 12/2020 | Sun | G01J 11/00 |

FOREIGN PATENT DOCUMENTS

| | | | | | |
|---|---|---|---|---|---|
| CN | 110207837 A | | 9/2019 | | |
| CN | 112683495 A | * | 4/2021 | | |
| CN | 114024611 A | * | 2/2022 | ........ | H04B 10/6151 |
| WO | WO-2010091180 A2 | * | 8/2010 | ............. | G01J 11/00 |
| WO | WO-2020232790 A1 | * | 11/2020 | ........ | H04Q 11/0062 |

OTHER PUBLICATIONS

Come et al;Real-time measurement of complex fast signals by bandwidth compression in frequency shifting loops; Mar. 2020; Optics Letters, vol. 45, No. 6; pp. 1-4. (Year: 2020).*

Li et al; Time-magnified photon counting with 550-fs resolution; Aug. 2021, Optical Society of America; pp. 1-4. (Year: 2021).*

First Office Action prepared by the State Intellectual Property Office of the P.R. China for 202111374016.5 Oct. 10, 2022, 7 pages.

* cited by examiner

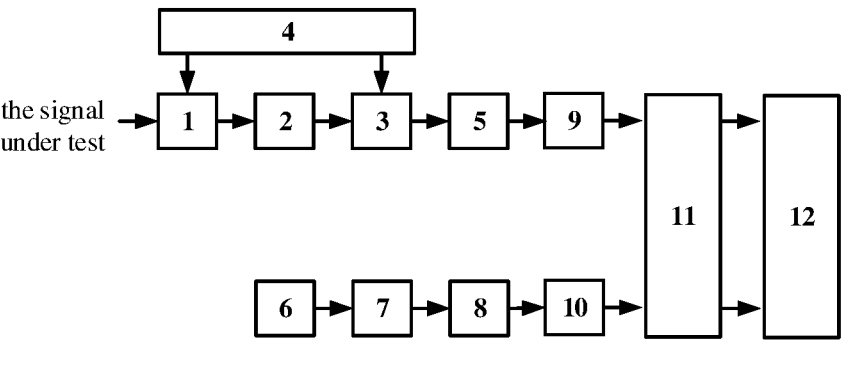
FIG. 1
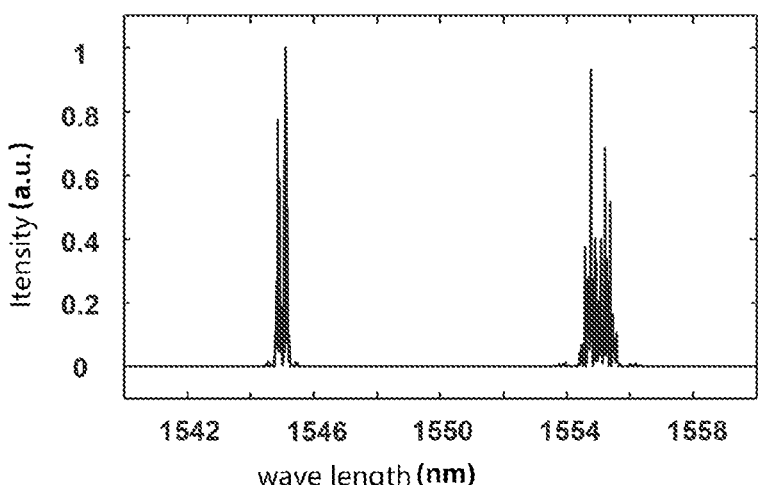
FIG. 2
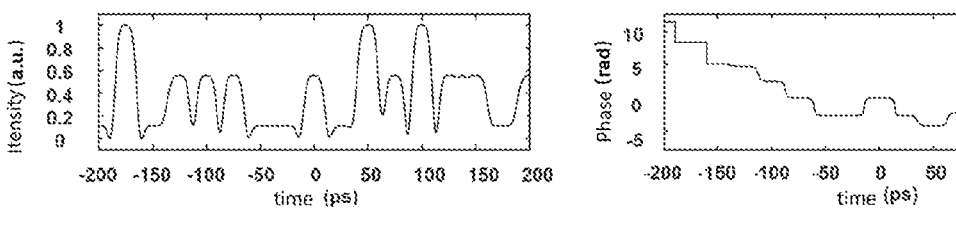
FIG. 3A                                                    FIG. 3B

REAL-TIME VECTOR ANALYSIS METHOD AND DEVICE FOR DETECTING OPTICAL SIGNAL WITH BANDWIDTH GREATER THAN 1 THz

CROSS-REFERENCE TO RELATED APPLICATIONS

This is a continuation of International Patent Application No. PCT/CN2022/132832 filed on Nov. 18, 2022, which claims priority to Chinese Patent Application No. 202111374016.5 filed on Nov. 19, 2021. The disclosures of the above-referenced applications are hereby incorporated by reference in their entirety.

BACKGROUND

With an emergence of femtosecond mode-locked lasers and a rapid development of high-speed, large-capacity optical communication technology, real-time measurement and characterization of high-speed signals have become an urgent scientific issue to be solved. Meanwhile, a characterization of advanced modulation format signals in optical communication, acquisition and analysis of arbitrary waveforms and non-repetitive events have pushed an analysis complexity of the optical signals to a new level, which puts forward higher requirements for measuring and processing of the optical signals.

A conventional method that converts the optical signals into electrical signals through a photodetector and then uses an electrical system for signal processing makes it difficult to achieve real-time measurement and observation of an optical signal with a bandwidth greater than 100 GHz, usually only a single-dimensional intensity information can be obtained, and a cost is also very high.

The conventional methods of electrical analysis and optical signal processing are limited by an analog-to-digital conversion bandwidth, a digital-to-analog conversion bandwidth, and a detector bandwidth, therefore the conventional methods are difficult to apply to this real-time vector measurement and analysis scenario for large-bandwidth optical signal. With the development of time domain optics, some new ways have been developed for large-bandwidth signal measurement and analysis, among which time domain imaging is the most widely researched. In order to characterize ultrashort pulse sources with femtosecond order precision, Rick Trebino and Dan Kane proposed a frequency-resolved optical switch method, with which a pulse under test is divided into two beams and a relative time delay is produced. A two-dimensional cm, and then the intensity information and the phase information of the pulse can be extracted by using a two-dimensional phase reconstruction iterative algorithm (D J Kane and R. Trebino. Single-shot measurement of the intensity and the phase of an arbitrary ultrashort pulse source by using frequency-resolved optical gating. Optics Letters, 1993, vol. 18, no. 10, 823-825). However, a measurement range of the time window of the frequency-resolved optical switch method is usually only tens of picoseconds, and the measurement frame rate is also very limited, therefore real-time ultra-fast measurement cannot be achieved.

Time-lens magnification technology is another way to measure high-speed signals. One of original intentions of this technology is to solve the difficulty in detecting the high-speed optical waveforms due to a limited detection bandwidth. Similar to a space lens magnification system, an input signal can be amplified by passing through an imaging system of time domain. In this scheme, a signal under test, after being time stretched by a first dispersive device, passes through a time-lens system, and then is continuously stretched by a second dispersive unit. At this time, a second stage dispersion amount is N times a first stage dispersion amount. A time window of a signal finally outputted is N times a time window of the signal under test. Therefore, a detection bandwidth and an analog-to-digital conversion bandwidth, collected by the system, of the signal under test are reduced by N times. A high-speed signal is amplified through the time-lens system, which is equivalent to being slowed down, and then the high-speed signal can be collected and observed with a low-speed real-time sampling system (R Salem et al. Optical time lens based on four-wave mixing on a silicon chip. Optics Letters, 2008, vol. 33, no. 10 1047-1049) . A magnification of the system is equal to a ratio of an output dispersion to an input dispersion. A measurement range of the time window of the system is determined by a size of a dispersion of a front pump. The measurement range of the time window of the system, limited by a restriction among a magnification and a dispersion amount, is usually 200 ps. In order to expand the measurement range of the time window of the system, an effective multiplication of the measurement range of the time window can be realized by using a delay buffer ring technology in combination with a time domain amplification method. A time domain segmentation method effectively improves a range of a time window for a signal, but a frame rate of a measurement is restricted. At the same time, only an intensity information of an optical signal that changes with time is obtained, and a phase change information of another dimension is ignoring. Another important way in time domain optics for realizing ultrafast waveform measurement is a temporal Fourier transform, which avoids a bandwidth-limited problem of a time domain detection by converting a time domain waveform to a spectrum for measurement. A way to realize the temporal Fourier transform is a method mainly based on time-lens. A realization method of the time-lens is usually based on nonlinear parametric processes such as electro-optic phase modulator and four-wave mixing. After the input signal is transmitted through an input dispersion, and then is loaded on a quadratic phase modulation in the time domain through the time-lens. Finally, a temporal information of a signal under test is mapped from the time domain to a frequency domain by an output dispersion. When the input dispersion is equal to the output dispersion, a magnitude of a spectrum of an output optical field is a mapping of a time domain of the output optical field (M. Foster et al. Silicon-chip-based ultrafast optical oscilloscope. Nature, 2008, vol. 456, no. 7218, 81-84). However, with this method, the time window is limited by a size of the time window of the time-lens, thus only a characterization of a single intensity change information can be realized.

In order to simultaneously capture an intensity information and a phase information of a large-bandwidth signal, a frequency spectrum segmentation technique has also been widely used. A multi-channel coherent detection of the large-bandwidth signal is realized by utilizing local oscillator sources of different frequencies to complete detection and reception, at the same time the intensity information and the phase information of different frequency spectrum segments are obtained, and then a spectrum restoration in the frequency domain is performed. A temporal vector information of the large-bandwidth is obtained by utilizing a Fourier inverse transform (N. Fontaine et al. Real-time full-field arbitrary optical waveform measurement. Nature Photonics, 2010, vol. 4, no. 4, 248-254). A limitation from a bottleneck of an electrical bandwidth is effectively avoided by this measurement method. But a system complexity of this measurement method is high, and a further expansion of a detection bandwidth to a THz order of this measurement method is greatly restricted. Through an analysis of an existing technology, it can be found that current real-time analysis and measurement of the large-bandwidth signal are difficult to achieve under a measurement bandwidth of THz order that not only the measurement time window and a low complexity of the system are ensured, but also at the same time, a full-field information including an intensity and a phase are obtained in real-time for vector analysis.

SUMMARY

The present disclosure relates to a technical field of real-time measurement of optical signals with a bandwidth greater than 1 THz, in particular to a simultaneous real-time acquisition and analysis of an intensity information and a phase information of signals with a bandwidth greater than 1 THz.

A technical problem to be solved by the present disclosure is to propose a method and a device. The method and the device, by using a single-channel receiving terminal, are enable to realize a real-time analysis of an optical signal with a bandwidth greater than 1 THz, to realize an simultaneous obtaining of a full-field information including an intensity and a phase of a signal in frequency domain and time domain.

In order to solve the above technical problems, in a first aspect the present disclosure proposes a measurement method that has a large detection bandwidth and can measure the intensity and the phase in real-time, including:

step A, performing a temporal Fourier transform on a signal under test by a time-lens focusing system to obtain a real-time spectral information mapped to a time domain waveform signal;

step B, obtaining, by fully broadening an ultrashort pulse source by a dispersion interaction with a dispersion amount of $\Phi_1$, a time domain spectrum of the ultrashort pulse source to form a chirped swept frequency source, the chirped swept frequency source used as a local oscillator source for a coherent detection;

step C, performing the coherent detection on the real-time spectral information mapped onto the time domain waveform signal and the local oscillation to obtain an optical signal, and then converting the optical signal into an electrical signal, wherein the electrical signal is, by data acquisition and processing, recovered into an intensity information and a phase information of frequency domain of the signal under test, the intensity information and the phase information of frequency domain being full-field information of frequency domain of the signal under test;

step D, performing an inverse Fourier transform on a full-field information of frequency domain of the signal under test, to recover a temporal full-field information of the signal under test.

In some embodiments, the step A includes:

step A1, intercepting, via an electro-optic intensity modulator, the signal under test within a time window, and performing an intensity modulation on the signal under test within the time window intercepted;

step A2, loading, by an electro-optic phase modulator, a temporal quadratic phase $\varphi(t)$ on the signal under test

4 within the time window wherein $\varphi(t) = -it^2/2\Phi_f$, i being an imaginary number unit, $\Phi_f$ being a focal length of a time lens, t being time;

step A3, compressing the signal under test within the time window range which has been loaded with the quadratic phase, by a fiber dispersion interaction with a dispersion amount $\Phi_2$ to obtain the real-time spectral information mapped to a temporal waveform signal of the signal under test, the dispersion amount $\Phi_2$ being an image distance of the time-lens focusing system.

In some embodiments, the coherent detection in step C comprises: simultaneously obtaining two in-phase and quadrature interference signals utilizing a phase diversity technology, and recovering the full-field information of frequency domain of the signal under test within the time window by analyzing the two in-phase and quadrature interference signals.

In a second aspect, the present disclosure also proposes an optical signal real-time vector analysis device with a detection bandwidth greater than 1 THz, including a time-lens focusing system, a first optical fiber mode-locked laser, a first dispersion compensation optical fiber, an optical band-pass filter, a first polarization controller, a second polarization controllers, a coherent receiver, a real-time oscilloscope;

the time-lens focusing system is configured for performing a temporal Fourier transform on a signal under test to realize a mapping transformation from a frequency domain to a time domain of the signal under test;

the first optical fiber mode-locked laser is configured for producing an ultrashort pulse source sequence with a pulse width less than 1 ps and a pulse repetition rate with an order of MHz;

the first dispersion compensation optical fiber is configured for using in the first optical fiber mode-locked laser to function a dispersion stretching to realize a chirped swept frequency light source;

the optical band-pass filter is configured for controlling a working spectral range of the first optical fiber mode-locked laser, to avoid an aliasing of adjacent pulses during a time stretching process;

the first polarization controller and second polarization controller are used to control a polarization state of a signal light and a local oscillator source being inputted to the coherent receiver, so that a strongest interference effect of the signal light and the local oscillator source is achieved;

the coherent receiver is configured to realize the coherent detection of the signal light and the local oscillator source, and convert an optical signal into an electrical signal for output;

the real-time oscilloscope is configured for sampling and performing an analog-to-digital convert on the electrical signal outputted by the coherent receiver, and displaying the electrical signal in real time.

In some embodiments, the time-lens system includes an electro-optic intensity modulator, an electro-optic phase modulator, an arbitrary waveform generator, a second dispersion compensation optical fiber, and a first optical amplifier;

the electro-optic intensity modulator is configured for implementing a time window interception on the signal under test;

the electro-optic phase modulator is configured for loading a temporal quadratic phase on an optical signal within the time window;

the arbitrary waveform generator is configured for producing a radio frequency signal applied on the electro-optic intensity modulator and the electro-optic phase modulator;

the first optical amplifier is configured for amplifying the optical signal outputted by the electro-optic intensity modulator to compensate an optical power loss caused by an electro-optic intensity modulation and a system link;

the second dispersion compensation optical fiber is configured for performing a dispersion compression on the optical signal after being quadratic phase modulated to obtain a spectral information of time domain of the signal under test.

In some embodiments, a focal length $\Phi_f$ of the time-lens based on the electro-optic phase modulator is equal to an image distance of the time-lens focusing system which is a dispersion amount $\Phi_2$ the second dispersion compensation optical fiber, that is, $\Phi_f = \Phi_2$.

In some embodiments, a dispersion amount $\Phi_1$ of the first dispersion compensation optical fiber is equal to the dispersion amount $\Phi_2$ of the second dispersion compensation optical fiber, that is, $\Phi_1 = \Phi_2$.

The present disclosure has the following beneficial effects:

(1) The present disclosure realizes a real-time acquisition of the spectral information of time domain of the signal under test by the time-lens focusing system. A real-time measurement frame rate of the time-lens focusing system is consistent with a period of the time-lens, generally in a MHz order, therefore an ultrafast measurement of a frequency domain information of the signal under test is effectively realized.

(2) The intensity information and the phase information, which are full-field information of frequency domain of the signal under test, of the frequency domain of the signal under test are simultaneously acquired by the present disclosure through the coherent detection process of the chirped swept frequency source and the time domain spectrum signal of the signal under test. The full-field information of frequency domain is inverse Fourier transformed, and the full-field information of frequency domain of the signal under test is also obtained. Therefore, what the present disclosure obtains is the full-field information of the frequency domain and the time domain of the signal under test.

(3) The present disclosure uses a chirped swept frequency light source as a coherent detection local oscillator source, to convert a frequency of the signal under test to a fundamental frequency. Therefore, a demand for electrical analog bandwidth is reduced, a structure complexity of an entire detection system is effectively reduced, a measurement bandwidth of the detection system is improved, and a measurement for bandwidth greater than 1 Thz is achieved.

(4) A repetition rate of the chirped swept frequency light source and the period of the time-lens system of the present disclosure can be adjusted according to requirements of different measurement scenarios. For a high-speed and dynamically changing signal under test, a repetition rate of a swept frequency source and the period of the time-lens system can be increased, therefore a measurement with a higher frame rate can be achieved and the full-field information of the frequency domain and the time domain of the signal under test which changes at a high speed can be captured. Therefore, the present disclosure is of great significance in a real-time measurement scene of the full-field information of a high-speed signal.

BRIEF DESCRIPTION OF DRAWINGS

Technical solutions of the present disclosure will be further described in detail below in conjunction with accompanying drawings and specific embodiments. Apparently, the embodiments described represent only a portion of the embodiments of the present disclosure, not all embodiments. Based on the embodiments in the present disclosure, all other embodiments acquired by a person skilled in the art without inventive labor fall within a protection scope sought by the present disclosure FIG. 1 is a schematic diagram of a real-time vector analysis device for detecting an optical signal with a bandwidth greater than 1 THz according to some embodiments of the present disclosure;

FIG. 2 shows a spectrum information of time domain of the signal under test passing through a time-lens focusing system, and a horizontal coordinate axis is obtained by mapping of time-to-wavelength relationship;

FIG. 3A shows an intensity information loaded on a channel carrier 1545 nm in an embodiment;

FIG. 3B shows a 160 Gb/s-16QAM phase symbol information loaded on a channel carrier 1545 nm in an embodiment;

DETAILED DESCRIPTION

Figure 3C:
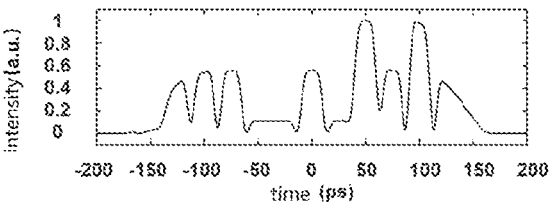
FIG. 3C shows a simulation result of an intensity information loaded on the channel carrier 1545 nm measured by the device according to some embodiments of the present disclosure.

A real-time vector analysis device for detecting an optical signal with a bandwidth greater than 1 THz is shown in FIG. 1, the device includes a time-lens focusing system, a first optical fiber mode-locked laser 6, an optical band-pass filter 7, a first dispersion compensation optical fiber 8, and a second polarization controller 9, a first polarization controller 10, a coherent receiver 11, and an oscilloscope 12; the time-lens focusing system includes an electro-optic intensity modulator 1, a first optical amplifier 2, an electro-optic phase modulator 3, an arbitrary waveform generator 4, and a second dispersion compensation optical fiber 5.

The time-lens focusing system is configured for performing a temporal Fourier transform on a signal under test to realize a mapping transformation from a frequency domain to a time domain of the signal under test; the first optical fiber mode-locked laser is configured for producing an ultrashort pulse source sequence with a pulse width less than 1 ps and a pulse repetition rate with an order of MHz; the first dispersion compensation optical fiber is configured for using in the first optical fiber mode-locked laser to function a dispersion stretching to realize a chirped swept frequency light source; the optical band-pass filter is configured for controlling a working spectral range of the first optical fiber mode-locked laser, to avoid an aliasing of adjacent pulses during a time domain stretching process; the first polarization controller and second polarization controller are configured respectively to control a polarization state of a signal and a polarization state of a local oscillator source inputted to the coherent receiver, so that a strongest interference effect of the signal light and the local oscillator source is achieved; the coherent receiver is configured to realize the coherent detection of the signal light and the local oscillator source, and convert an optical signal into an electrical signal for output; the real-time oscilloscope is configured for sampling and performing an analog-to-digital convert on the electrical signal outputted by the coherent receiver, and displaying the electrical signal in real time.

The electro-optic intensity modulator is configured for implementing a time window interception on the signal under test; the electro-optic phase modulator is used for loading an optical signal within the window with a temporal quadratic phase; the arbitrary waveform generator is configured for producing a radio frequency signal applied on the electro-optic intensity modulator and the electro-optic phase modulator; the first optical amplifier is configured for amplifying the optical signal outputted by the electro-optic intensity modulator to compensate an optical power loss caused by an electro-optic intensity modulation and a system link; the second dispersion compensation optical fiber is configured for performing a dispersion compression on the optical signal after being quadratic phase modulated to obtain a spectral information of time domain of the signal under test.

In some embodiments, a focal length $\Phi_f$ of the time-lens based on the electro-optic phase modulator is equal to an image distance of the time-lens focusing system which is a dispersion amount $\Phi_2$ of the second dispersion compensation optical fiber, that is, $\Phi_f = \Phi_2$ In some embodiments, a dispersion amount $\Phi_1$ of the first dispersion compensation optical fiber is equal to the dispersion amount $\Phi_2$ of the second dispersion compensation optical fiber, that is, $\Phi_1 = \Phi_2$.

A real-time vector analysis method for detecting an optical signal with a bandwidth greater than 1 THz according to some embodiments of the present disclosure includes:

1) a Gaussian ultrashort pulse source signal with a pulse width of about 1 ps and a pulse repetition frequency of 20 MHz is outputted by the first optical fiber mode-locked laser, and a time domain waveform of a single ultrashort pulse source signal is expressed as $E_1(t)$. The specific expression of the time domain waveform of a single ultrashort pulse source signal is as follows:

$$E_1(t) = \sqrt{I_1}\,\exp\left[-2\ln 2\left(\frac{t-t_0}{t_{PW}}\right)^2\right]\exp(i\omega_{LO}t + i\phi_1) \tag{1}$$

In the above formula, $I_1$ is an intensity of the ultrashort pulse source signal outputted by the first optical fiber mode-locked laser, $t_{PW}$ is a pulse width of the ultrashort pulse source signal outputted by the first optical fiber mode-locked laser, $\omega_{LO}$ is a spectrum center frequency of the ultrashort pulse source signal, $\phi_1$ is an initial phase of the ultrashort pulse source signal, to is a center reference time of a time window for measurement. A repetition rate of the above Gaussian ultrashort pulse source signal is with an order of MHz.

2) an expression of a chirped swept frequency light source from the first optical fiber mode-locked laser obtained by dispersion stretched by the first dispersion compensation optical fiber can be obtained from a light pulse linear propagation formula in a fiber. An analytical model is simplified, an effect of higher-order dispersion in a dispersion is disregard, and nonlinear effects are avoided. The dispersion satisfies a far-field dispersion condition, and an electric field of a time domain signal of a local oscillator source outputted can be approximately expressed as:

$$E_{LO}(t) = \mathcal{F}^{-1}\left\{U_1(\omega)\exp\left[-i\Phi_1\frac{(\omega-\omega_{LO})^2}{2}\right]\right\} \tag{2}$$

$$= \sqrt{\frac{I_1 t_{PW}^2}{4\ln 2\Phi_1}\left(\frac{t_{PW}^2}{4\ln 2\Phi_1} - i\right)} \cdot$$

$$\exp\left[-\left(\frac{t_{PW}^2}{8\ln 2\,\Phi_1^2} - i\frac{1}{2\Phi_1}\right)(t-t_0)^2\right]\exp(i\omega_{LO}t + i\phi_1)$$

In the above formula, $U_1(\omega)$ is a frequency domain expression of $E_1(t)$, and $\Phi_1$ is a group velocity dispersion of the first dispersion compensation optical fiber;

3) when the signal under test passes through the time-lens system, the time window is intercepted by the electro-optic intensity modulator, and the quadratic phase is loaded to the optical signal by the electro-optic phase modulator, a specific expression of a modulated optical signal being:

$$E_i(t) = E_s(t)\exp\left[-2\ln 2\left(\frac{t-t_0}{T}\right)^2\right]\exp\left[-i\frac{(t-t_0)^2}{2\Phi_f}\right] \tag{3}$$

In the above formula, Es(t) is an expression of the signal under test, Tis a size of a time window of the time-lens system within each period, and $\Phi_f$ is the focal length of the time-lens;

4) when a modulated signal passes through the second dispersion compensation optical fiber for dispersion compression, an outputted time domain signal waveform is obtained from the light pulse linear propagation formula in a fiber:

$$E_{out}(t) = \mathcal{F}^{-1}[U_i(\omega)D_2(\omega)] \tag{4}$$

$$= \sqrt{\frac{T^2}{i4\ln 2\Phi_2}}\exp\left[-\frac{4\ln 2\Phi_2 + iT^2(t_0^2 - t^2)}{2\Phi_2 T^2} + i\omega_{LO}t\right]$$

$$U_s\left(\frac{t-t_0}{\Phi_2} + \omega_{LO}\right) * \exp\left\{-\frac{T^2}{8\ln 2}\left[\frac{t-t_0}{\Phi_2} + \omega_{LO} + i\frac{4\ln 2}{T^2}t_0\right]^2\right\}$$

In the above formula, $U_i(\omega)$ is a frequency domain representation of a light field of an output signal of the time-lens system, $\Phi_2$ is the group velocity dispersion of the first dispersion compensation optical fiber, $\Phi_f$ is equal to $\Phi_2$, and $\Phi_2$ is equal to $\Phi_1$, $U_s(\omega)$ is the frequency domain representation of a light field of the signal under test. The temporal Fourier transform of the signal under test has been completed by the time-lens focusing system, and the spectral information of the signal under test is mapped to the time domain waveform.

5) A spectrum information of time domain $E_{out}(t)$ of the signal under test obtained by the temporal Fourier transform and a swept frequency source $E_{LO}(t)$ are respectively inputted as a signal light and a local oscillator source into a coherent receiver. A polarization state is aligned, by adjusting the polarization controller, with an interference, to ensure the strongest interference intensity. A phase diversity technology is performed, and then two in-phase and quadrature interference signals can be obtained through outputted by two balanced detectors, the two in-phase and quadrature interference signals can be represented as:

$$\begin{cases} I(t) = E_{out}(t)E_{LO}(t)^* + E_{out}(t)^* E_{LO}(t) \\ Q(t) = E_{out}(t)E_{LO}(t)^* \exp\left(i\frac{\pi}{2}\right) + E_{out}(t)^* E_{LO}(t)\exp\left(i\frac{\pi}{2}\right) \end{cases} \quad (5)$$

6) A vector information including intensity and phase is obtained by an analog-to-digital conversion, and data acquisition and processing. In order to simplify a calculation, we do not consider an influence of high-order dispersion and nonlinearity here. A time-to-frequency transform relationship is utilized: $t=t_0+\Phi_f(\omega-\omega_{LO})$, a time axis is transformed into a frequency axis, and an expression of a recovered full-field information of the frequency domain of the intensity information and the phase information is as follows:

$$U_{Full}(\omega) = \frac{Tt_{PW}\sqrt{2\pi I_1}}{4\ln 2\Phi_f}\left[U_s(\omega) * \exp\left(-\frac{T^2}{8\ln 2}\omega^2 - i\omega t_0\right)\right] \quad (6)$$

$$\exp\left[-\frac{t_{PW}^2}{8\ln 2}(\omega-\omega_{LO})^2\right]\exp[i(\omega-\omega_{LO})t_0 - i\phi_1]$$

7) The inverse Fourier transform is performed on the formula (6), to obtain a full-field information of time domain of the signal under test which can be approximately expressed as:

$$E_{Full}(t) = \mathcal{F}^{-1}[U_{Full}(\omega)\exp(-i\omega t_0)] \quad (7)$$

$$= \frac{\sqrt{2\pi I_{LO}}}{\Phi_f}\left\{E_s(t)\cdot\exp\left[-\frac{2\ln 2}{T^2}(t-t_0)^2\right]\right\} *$$

$$\exp\left(-\frac{2\ln 2}{t_{PW}^2}t^2 + i\omega_{LO}t\right)\exp[-i(\omega_{LO}t_0 + \phi_{LO})]$$

When a pulse width of the local oscillator source is infinitely narrow, the formula (7) can be further simplified and approximated as:

$$E_{Full}(t) = \frac{2\pi}{\Phi_f}\sqrt{I_1}E_s(t)\cdot\exp\left[-\frac{2\ln 2}{T^2}(t-t_0)^2\right]\exp[-i(\omega_{LO}t_0 + \phi_1)] \quad (8)$$

It can be seen from the above formula that the full-field information of the frequency domain and time domain of the signal under test are both recovered in real time, therefore requirements for a bandwidth of a detector and a number of detection receiving terminal are effectively reduced. Not only an intensity information of is obtained, but also phase information of dimension is obtained at the same time, thus a real-time vector analysis of the full-field information is realized. For fast-changing signals, the time-lens system can also capture a change information of vector of the fast-changing signals at a frame rate with an order of MHz. The following will illustrate by application examples.

Application Examples

Some technical solutions of the embodiments of the present disclosure are verified that have a capability for real-time vector analysis of large bandwidth signals. In some embodiments, the signal under test is a signal of 160 Gb/s and 16QAM with a channel carrier of 1545 nm and a dual-channel advanced modulation format signal of 400 Gb/s and 16QAM with a channel carrier of 1555 nm. A system observation bandwidth is greater than 10 nm, and a time window is 300 ps. Intensity and phase informations of two channel carriers are acquired simultaneously, and a real-time vector measurement and a channel monitoring of the large bandwidth signals are realized by the device of the present disclosure.

FIG. 2 shows a spectrum information of time domain of the signal under test passing through a time-lens focusing system, and a horizontal coordinate axis is obtained by mapping of time-to-wavelength relationship.

Figure 3D:
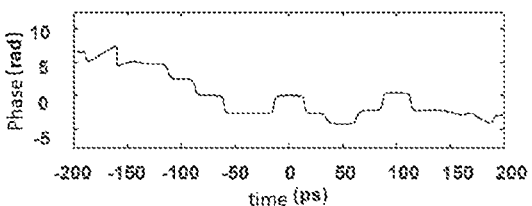
FIG. 3D shows a simulation result of the 160 Gb/s-16QAM phase symbol information loaded on the channel carrier 1545 nm measured by the device according to some embodiments of the present disclosure.
Figure 3D:

FIG. 3A shows an intensity information loaded on a channel carrier 1545 nm in an embodiment; FIG. 3C shows a simulation result of an intensity information loaded on the channel carrier 1545 nm measured by the device according to some embodiments of the present disclosure; FIG. 3B shows a 160 Gb/s-16QAM phase symbol information loaded on the channel carrier 1545 nm in an embodiment; FIG. 3D shows a simulation result of the 160 Gb/s-16QAM phase symbol information loaded on the channel carrier 1545 nm measured by the device according to some embodiments of the present disclosure.

Figure 4A:
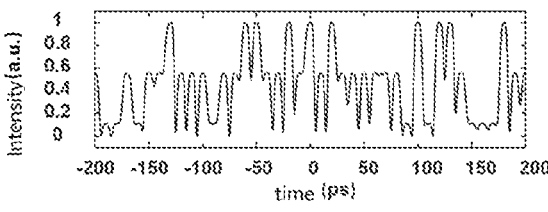
FIG. 4A shows an intensity information loaded on a channel carrier 1555 nm in an embodiment.
Figure 4B:
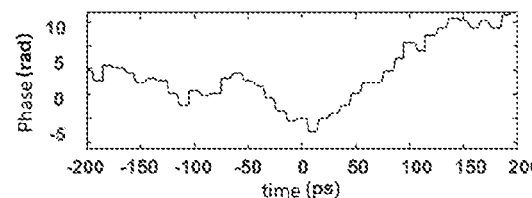
FIG. 4B shows a 160 Gb/s-16 QAM phase symbol information loaded on the channel carrier 1555 nm in an embodiment.
Figure 4C:
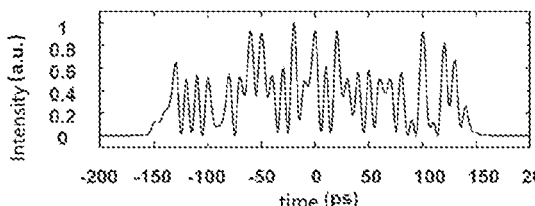
FIG. 4C shows a simulation result of an intensity information loaded on the channel carrier 1555 nm measured by the device of the present disclosure.
Figure 4D:
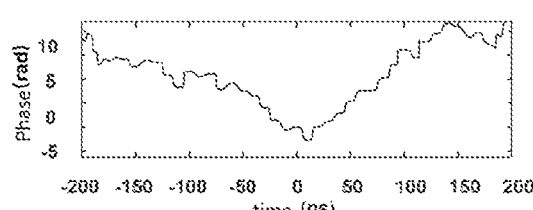
FIG. 4D shows a simulation result of a 400 Gb/s-16QAM phase symbol information loaded on the channel carrier 1555 nm measured by the device according to some embodiments of the present disclosure.

FIG. 4A shows an intensity information loaded on a channel carrier 1555 nm in an embodiment; FIG. 4C shows a simulation result of an intensity information loaded on the channel carrier 1555 nm measured by the device of the present disclosure; FIG. 4B shows a 400 Gb/s-16QAM phase symbol information loaded on the channel carrier 1555 nm in an embodiment; FIG. 4D shows a simulation result of the 400 Gb/s-16QAM phase symbol information loaded on the channel carrier 1555 nm measured by the device according to some embodiments of the present disclosure. It can be seen from the accompanying drawings that the full-field information of time domain and frequency domain for large bandwidth signals can be achieved in real-time, and a vector analysis can be completed by real-time vector analysis method and device for detecting an optical signal with a bandwidth greater than 1 THz.

In some embodiments, a real-time vector analysis method for detecting an optical signal with a bandwidth greater than 1 THZ includes:

step A, performing a temporal Fourier transform on a signal under test by a time-lens focusing system to obtain a real-time spectral information mapped to a temporal waveform signal;

step B, obtaining, by fully broadening an ultrashort pulse source by a dispersion interaction with a dispersion amount of $\Phi_1$, a time domain spectrum of the ultrashort pulse source to form a chirped swept frequency source, the chirped swept frequency source used as a local oscillator source for a coherent detection;

step C, performing the coherent detection on the real-time spectral information mapped to the temporal waveform signal and the local oscillator source to obtain an optical signal, and then converting the optical signal into an electrical signal, wherein the electrical signal is, by data acquisition and processing, recovered into an intensity information and a phase information of frequency domain of the signal under test, the intensity information and the phase information of frequency domain being full-field information of frequency domain of the signal under test;

step D, performing an inverse Fourier transform on a frequency-domain full-field information of the signal under test, to recover a time domain full-field information of the signal under test.

The above specific embodiments are only used to further illustrate the real-time vector analysis method and device for detecting an optical signal with a bandwidth greater than 1 Thz of the present disclosure, and the present disclosure is not limited to the embodiments. It should be pointed out that those skilled in the art can also make modifications or equivalent replacements to the technical solutions of the present disclosure without departing from the technical principle of the present disclosure, which should be covered by the scope of the claims of the present disclosure.

What is claimed is:

1. A real-time vector analysis method for detecting an optical signal with a bandwidth greater than 1 THz, comprising:

performing a temporal Fourier transform on a signal under test by a time-lens focusing system to obtain a real-time spectral information mapped to a temporal waveform signal;

obtaining, by fully broadening an ultrashort pulse source by a dispersion interaction with a dispersion amount of $\Phi_1$, a time domain spectrum of the ultrashort pulse source to form a chirped swept frequency source, the chirped swept frequency source used as a local oscillator source for a coherent detection;

performing the coherent detection on the real-time spectral information mapped to the temporal waveform signal and the local oscillator source to obtain an optical signal, and then converting the optical signal into an electrical signal, wherein the electrical signal is, by data acquisition and processing, recovered into an intensity information and a phase information of frequency domain of the signal under test, the intensity information and the phase information of frequency domain being full-field information of frequency domain of the signal under test;

performing an inverse Fourier transform on the full-field information of frequency domain of the signal under test, to recover a full-field information of time domain of the signal under test;

wherein the performing the temporal Fourier transform on the signal under test by the time-lens focusing system to obtain the real-time spectral information mapped to the temporal waveform signal further comprises:

intercepting, via an electro-optic intensity modulator, the signal under test within a time window, and performing an intensity modulation on the signal under test within the time window intercepted;

loading, by an electro-optic phase modulator, a temporal quadratic phase $\varphi(t)$ on the signal under test within the time window, wherein $\varphi(t)=-it^2/2\Phi_f$, i being an imaginary number unit, $\Phi_f$ being a focal length of a time-lens, t being time;

compressing the signal under test within the time window which has been loaded with the quadratic phase, by a fiber dispersion interaction with a dispersion amount $\Phi_2$ to obtain the real-time spectral information mapped to a temporal waveform signal of the signal under test, the dispersion amount $\Phi_2$ being an image distance of the time-lens focusing system.

2. The real-time vector analysis method for detecting an optical signal with a bandwidth greater than 1 Thz according to claim 1, wherein the focal length $\Phi_f$ of the time-lens is equal to the image distance $\Phi_2$ of the time-lens focusing system, that is $\Phi_f=\Phi_2$.

3. The real-time vector analysis method for detecting an optical signal with a bandwidth greater than 1 Thz according to claim 1, wherein the image distance $\Phi_2$ of the time-lens focusing system is equal to the dispersion amount $\Phi_1$ that is, $\Phi_2=\Phi_1$.

4. The real-time vector analysis method for detecting an optical signal with a bandwidth greater than 1 THz according to claim 1, wherein the coherent detection further comprises: simultaneously obtaining two in-phase and quadrature interference signals utilizing a phase diversity technology, and recovering the full-field information of frequency domain of the signal under test within the time window by analyzing the two in-phase and quadrature interference signals.

5. A real-time vector analysis device for detecting an optical signal with a bandwidth greater than 1 THz, comprising: a time-lens focusing system, a first optical fiber mode-locked laser, an optical band-pass filter, a first dispersion compensation optical fiber, a first polarization controller, a second polarization controller, a coherent receiver, and a real-time oscilloscope, wherein, the time-lens focusing system is configured for performing a temporal Fourier transform on a signal under test to realize a mapping transformation from a frequency domain to a time domain of the signal under test;

the first optical fiber mode-locked laser is configured for producing an ultrashort pulse source sequence with a pulse width less than 1 ps and a pulse repetition rate with an order of MHz;

the first dispersion compensation optical fiber is configured for using in the first optical fiber mode-locked laser to function a dispersion stretching to realize a chirped frequency swept-source;

the optical band-pass filter is configured for controlling a working spectral range of the first optical fiber mode-locked laser, to avoid an aliasing of adjacent pulses during a time-stretching process;

the first polarization controller and second polarization controller are configured respectively to control a polarization state of a signal and a polarization state of a local oscillator source inputted to the coherent receiver, so that a strongest interference effect of the signal light and the local oscillator source is achieved;

the coherent receiver is configured to realize the coherent detection of the signal light and the local oscillator, and convert an optical signal into an electrical signal for output; and the real-time oscilloscope is configured for sampling and performing an analog-to-digital convert on the electrical signal outputted by the coherent receiver and displaying the electrical signal in real time;

wherein the time-lens focusing system comprises an electro-optic intensity modulator, an electro-optic phase modulator, an arbitrary waveform generator, a second dispersion compensation optical fiber, and a first optical amplifier, wherein, the electro-optic intensity modulator is configured for implementing a time window interception on the signal under test;

the electro-optic phase modulator is configured for loading a temporal quadratic phase on an optical signal within the time window;

the arbitrary waveform generator is configured for producing a radio frequency signal applied on the electro-optic intensity modulator and the electro-optic phase modulator;

the first optical amplifier is configured for amplifying the optical signal outputted by the electro-optic intensity modulator to compensate an optical power loss caused by an electro-optic intensity modulation and a system link; and the second dispersion compensation optical fiber is configured for performing a dispersion compression on the optical signal after being quadratic phase modulated to obtain a spectral information of time domain of the signal under test.

6. The real-time vector analysis device for detecting an optical signal with a bandwidth greater than 1 THz according to claim 5, wherein a focal length $\Phi_f$ of the time-lens based on the electro-optic phase modulator is equal to an image distance of the time-lens focusing system which is a dispersion amount $\Phi_2$ of the second dispersion compensation optical fiber, that is, $\Phi_f=\Phi_2$.

7. The real-time vector analysis device for detecting an optical signal with a bandwidth greater than 1 THz according to claim 6, wherein a dispersion amount $\Phi_1$ of the first dispersion compensation optical fiber is equal to the dispersion amount $\Phi_2$ of the second dispersion compensation optical fiber, that is, $\Phi_1=\Phi_2$.

* * * * *